United States Patent [19]

Harnden, Jr. et al.

[11] 3,862,415
[45] Jan. 21, 1975

[54] OPTO-ELECTRONIC OBJECT DETECTOR USING SEMICONDUCTOR LIGHT SOURCE

[75] Inventors: John D. Harnden, Jr.; William P. Kornrumpf, both of Schenectady, N.Y.

[73] Assignee: General Electric Company, Schenectady, N.Y.

[22] Filed: Oct. 31, 1972

[21] Appl. No.: 302,523

[52] U.S. Cl. ................................. 250/221, 250/239
[51] Int. Cl. ............................................. G06m 7/00
[58] Field of Search ...... 250/217 SS, 221, 239, 216, 250/552, 222

[56] References Cited
UNITED STATES PATENTS

| | | | |
|---|---|---|---|
| 2,078,800 | 5/1937 | Juchter | 250/239 X |
| 2,920,209 | 1/1960 | Asten | 250/239 |
| 3,304,430 | 2/1967 | Biard et al. | 250/552 |
| 3,527,949 | 9/1970 | Huth et al. | 250/552 |
| 3,621,268 | 11/1971 | Friedrich | 250/221 |
| 3,639,770 | 2/1972 | Zizelmann | 250/239 X |
| 3,697,762 | 10/1972 | Kurtz | 250/217 SS |

OTHER PUBLICATIONS
Allied Industrial Electronics Catalog No. 680, 1968, page 111.

*Primary Examiner*—James W. Lawrence
*Assistant Examiner*—T. N. Grigsby
*Attorney, Agent, or Firm*—Paul I. Edelson; Joseph T. Cohen; Jerome C. Squillaro

[57] ABSTRACT

A semiconductor light source and a photo-responsive device are positioned on a single header member with an optical barrier member between them. Light emitted by a semiconductor light source is reflected from an object in the path of propagation of the light and a portion of the reflected light is detected by the photosensitive device. Direct illumination of the photosensitive device by the semiconductor light source is prevented by the optical barrier member between them. A single simplified optical system may be used to both direct the light from the semiconductor light source toward the object to be detected and to collect light reflected from the object and focus it onto the photosensitive device.

11 Claims, 4 Drawing Figures

Patented Jan. 21, 1975 3,862,415

Patented Jan. 21, 1975

OPTO-ELECTRONIC OBJECT DETECTOR USING SEMICONDUCTOR LIGHT SOURCE

This invention relates to object detectors. More particularly, this invention relates to active optical transducers in which a beam of energy is directed from an energy source toward the location at which an object to be detected is expected and a portion of the energy reflected from the object is collected by a detector whose output is indicative of the presence or absence of the object.

Optical object detectors, also known as optical transducers, have found utility in a variety of applications. Examples of these applications include the counting and timing of objects passing through a point on an industrial production line for control purposes, systems for counting patrons entering or leaving commercial establishments, automatic door openers, or the like for persons or vehicles, and intrusion detection systems. These systems may be classified, for convenience of reference, as active systems or passive systems, and as direct beam systems or reflected energy systems. Each of these systems is referred to herein as an optical transducer system. It is to be understood that the word "optical" is used herein to refer to any form of electromagnetic energy which is capable of being focused by lenses and which interacts elasticly with opaque objects. As a minimum, these optical systems are to be understood to employ electromagnetic radiation in the far infrared, infrared, visible, and ultraviolet portions of the electromagnetic spectrum or in any combination. Similarly, for convenience, the term "light" is used herein to refer to the electromagnetic energy employed in the systems, it being understood that "light" as used herein refers to electromagnetic energy within the spectral range of far infrared to ultraviolet, including, but not limited to, visible light.

Active optical transducer systems are those which include a light source whose emitted energy interacts with the object to be detected. A photodetector receives the energy and provides an output from which is determined whether or not the interaction has taken place and accordingly whether or not the object was present. A passive optical object detection system employs only a photodetector and relies upon perturbation of the ambient light incident on the photodetector by the object to determine whether or not the object is present. In direct beam systems, the object to be detected intervenes between the photodetector and the light source, be the light source ambient or a light emitter included in the system, and the presence of the object is usually indicated by a decrease in the intensity of light incident upon the photodetector. In a reflected energy optical transducer system, the photodetector receives light reflected from the object to be detected and the presence of an object is usually indicated by an increase in the intensity of light incident upon the photodetector; again, the light reflected by the object onto the photodetector may be either ambient light or light from a light source included in the system which is directed onto the object.

Active optical transducers are in general more sensitive than passive optical transducers because, in an active system, light of known spatial, spectral and intensity characteristics is provided and the photodetector can be constructed to respond specifically to the energy provided. The practically achievable sensitivity of a passive system is limited by the necessity of reducing to an acceptable level false alarms produced by fluctuations in ambient energy level not related to motion of an object to be detected. On the other hand, active systems are in general more expensive than passive systems as a result of the cost of the light source itself, and of the fact that reasonable care is required in optical alignment of the light source and the photodetector. Direct beam systems require that the source of illumination and the photodetector be essentially diametrically opposed across the line of travel of the object to be detected. In some applications, this requirement may be inconvenient. Notably, in some production line control and intrusion detection systems, the requirement that the object to be detected intervene between the source of illumination and the photodetector provides a serious design constraint. In reflected energy systems, on the other hand, the photodetector may be essentially coplanarly located with the illumination source in a plane parallel to the direction of travel of the object to be detected. Since this invention relates to active reflected energy optical transducer systems, further discussion will be limited to such systems.

In prior art active reflected energy optical transducer systems, the light source is typically an incandescent lamp. In a first configuration of prior art systems, the light from the lamp is collimated and directed toward the expected location of an object to be detected by an optical system comprising a reflector, a tube, and a lens system. Light reflected from an object is collected and focused onto a photodetector by a second optical system comprising a tube and lens system. This configuration has the disadvantage of requiring two separate optical systems which are relatively expensive and which must be precisely aligned. In prior art configurations the light source and photodetector cannot share a single telescopic optical system because the physical size of the lens will not permit both the lamp and the photodetector to be sufficiently close to the focal point of a single lens system, nor were point sources nor point detectors available. In another prior art configuration, energy from the lamp is directed onto a half-silvered mirror which reflects it toward the location at which an object to be detected is expected. Light reflected from the object is returned to the half-silvered mirror which transmits it to a photodetector located on the opposite side thereof. This configuration is less expensive than the configuration employing two telescopic optical systems, but still requires critical alignment among the lamp, mirror, and photodetector, and has the further disadvantage of having its sensitivity decreased by a factor of four by the attenuation incident to the use of a half-silvered mirror.

It is accordingly, an object of this invention to provide an active reflected energy optical transducer system of improved sensitivity wherein the light source and photodetector share a single optical system.

It is another object to provide such a system in which a mirror is not required and satisfactory results are obtained with inexpensive optical elements.

Another object is to provide such a system in which the light source is very small.

Another object is to provide such a system in which the light source is a semiconductor device.

Yet another object is to provide such a system in which the intensity of the light source is increased by heat-sinking the light source.

A further object of this invention is to provide such a system in which the light source and photodetector are matched in spectral characteristics.

Briefly, and in accordance with one embodiment of this invention, an optical transducer is provided by disposing a semiconductor light source and a photo-responsive device immediately adjacent opposite sides of an optical barrier member. The semiconductor light source, photo-responsive device, and barrier member are attached to a single header member, with the barrier member generally perpendicular to the header. Light from the semiconductor light source illuminates an object to be detected and is reflected therefrom onto the photo-responsive device which is prevented by the barrier member from being directly illuminated by the semiconductor light source.

The novel features of this invention sought to be patented are set forth with particularity in the appended claims. The invention, together with further objects and advantages thereof, may be understood from a reading of the following specification and appended claims in view of the accompanying drawings in which:

Figures 1, 2:
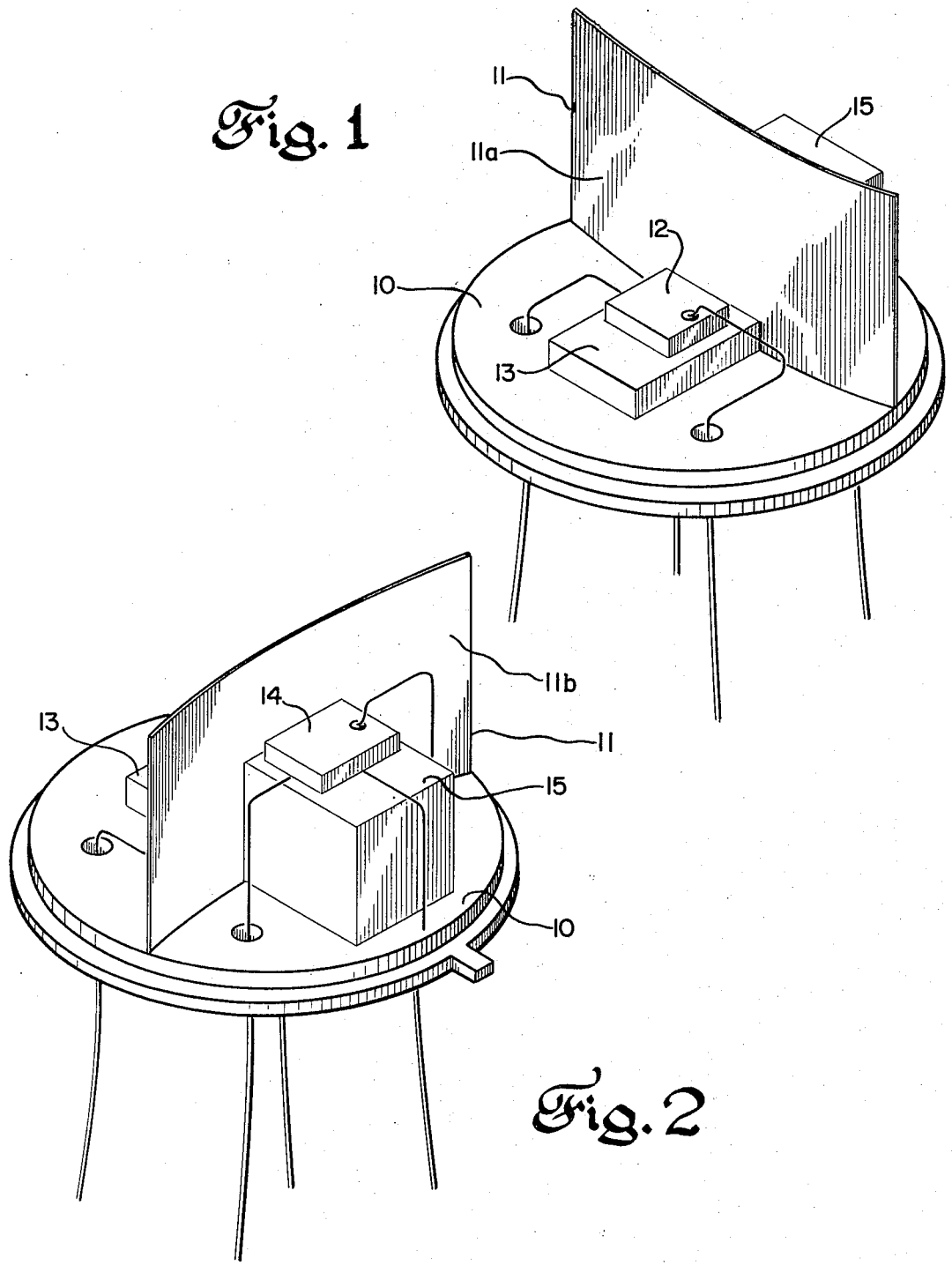
FIG. 1 is a perspective view of an active opto-electronic transducer in accordance with this invention.
FIG. 2 is a different perspective view of the active opto-electronic transducer of FIG. 1.

FIG. 1 is a perspective view of an active opto-electronic transducer in accordance with this invention showing base member 10, which may be a standard TO-5 transistor header having optical barrier member 11 disposed thereon and generally perpendicular thereto. Optical barrier member 11 may be formed of any convenient material, as, for example, mica, metal, or plastic, and in any event preferably has a non-reflective coating such as flat black paint applied thereto. Barrier member 11 may be attached to base member 10 by any convenient means as, for example, brazing, soldering, or cementing. Alternatively, base member 10 and barrier member 11 may be fabricated as a single unit as, for example, by casting of metal or compression molding of plastic. In either event, an optically absorptive coating such as flat black paint is preferably applied to base 10 and barrier 11. A semiconductor light source 12 is positioned adjacent a first side 11a of barrier 11. Semiconductor light source 12 is preferably a light-emitting diode and may, for example, be a gallium arsenide diode. Semiconductor light source 12 may be positioned directly on header member 10 if header member 10 is either made of an insulating material or has an insulating coating thereon. However, it is preferred to mount semiconductor light source 12 to header 10 by means of support means 13. Support means 13 is preferably formed of a thermally conductive material in order to provide improved heat sinking for semiconductor light source 12. Support means 13 is further preferably thermally conductive and electrically insulating, and may for example comprise beryllium oxide, boron nitride, or alumina. Improved heat sinking permits semiconductor light source 12 to be operated at increased power which results in higher illumination output therefrom and consequently allows object detection at greater distances. For maximum detection distances, the preferred construction is to support semiconductor light source 12 spaced from a metallic header 10 with a support means 13 of beryllium oxide or boron nitride.

FIG. 2 illustrates the active opto-electronic transducer of FIG. 1 rotated essentially 90° in order to present to view the components located on the other side of optical barrier member 11. As shown in FIG. 2, the transducer further comprises a photo-responsive device 14 positioned adjacent the second side 11b of optical barrier 11. Photo-responsive device 14 may, for example, be a phototransistor, a photodiode, a photoresistor, or a photoelectric cell. The spectral response characteristic of photo-responsive device 14 is preferably matched to the spectral distrubtion of energy emitted by semiconductor light source 12. For example, a highly satisfactory spectral matching has been achieved in one embodiment of this invention in which a gallium arsenide light-emitting diode was used for semiconductor light source 12 and a silicon phototransistor was used for photo-responsive means 14. The peak emission of the gallium arsenide light-emitting diode and the peak of the response characteristic of the silicon phototransistor were both essentially at a wavelength of 9,000 A. in the infrared region. Photo-responsive device 14 is preferably spaced from header 10 by support means 15 which is preferably formed in like manner with support means 13 as discussed above. Support means 15 is shown as supporting photo-responsive device 14 at a greater distance from header 10 than the distance at which support means 13 supports semiconductor light source 12 from header 10. This is desirable in one embodiment of this invention as may be better understood by reference to FIG. 3.

Figure 3:
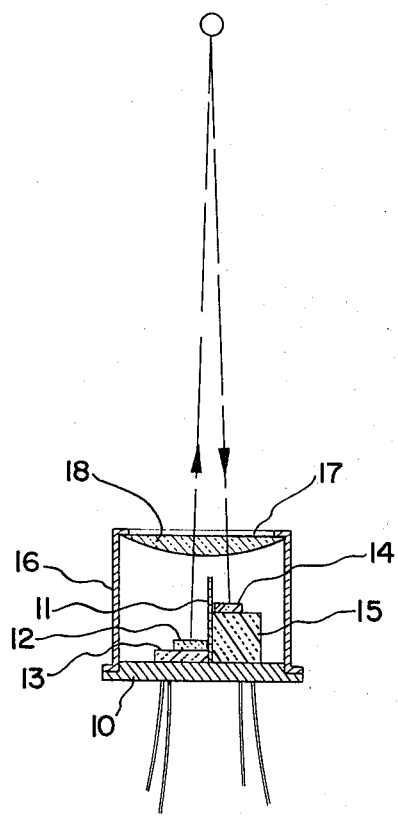
FIG. 3 is a cross-sectional elevation view of the active opto-electronic transducer of FIGS. 1 and 2.

FIG. 3 is a cross-sectional elevation view of the opto-electronic transducer of FIGS. 1 and 2 and illustrates additionally enclosure means having unitary optical focusing means included therein, and the optical geometry involved in the detection of an object. Base member 10 having barrier member 11, semiconductor light source 12, photo-responsive device 14, and support means 13 and 15 disposed thereon is enclosed by enclosure 16 having aperture 17 therein to permit light to pass therethrough. Aperture 17 may be sealed by optical focusing means 18 which may, for example, conveniently be a plano-convex lens. Enclosure member 16 provides protection for electronic elements 12 and 14. The closure of aperture 17 is optional and may be desired for protection of the electronic elements in some environments and may not be needed in others. If aperture 17 is either open or closed with a nonfocusing, i.e., flat sheet, of light transmissive material, satisfactory object detection is obtainable at ranges up to several feet. For object detection at greater ranges, focusing means such as lens 18 should be employed. Lens 18 is preferably coated with a non-reflective coating not shown. The matching of spectral distribution of semiconductor light source 12 to the spectral responsive characteristic of photo-responsive device 14 as described above is particularly advantageous in this embodiment because, as is known in the art, the non-reflective properties of known non-reflective coating materials are a function of wavelength of the energy incident thereon.

A further advantage in the use of a semiconductor light source in longer range opto-electronic transducers results from the fact that the semiconductor light source may be operated in a pulsed mode and the output signal of the photo-responsive device may be applied to a gating circuit synchronized with the driving pulse generator which energizes the semiconductor light source to provide for ehanced signal-to-noise ratio in the system output. In one configuration which has been constructed, a gallium aresenide light-emitting diode and a silicon phototransistor were mounted as shown in FIG. 3 and a flat, non-refractive non-reflectively coated, light-transmissive plate was used to seal aperture 17 in TO-5 can 16. Additionally, a planoconvex lens of approximately one and three-quarter inch diameter having a non-reflective coating thereon was positioned several inches from aperture 17. Using this configuration, it was possible, by carefully aligning this system, to reliably detect objects at distances greater than forty feet. The non-reflective coatings applied to the optical elements of this inventive system serve both to maximize the light transmitted therethrough and to minimize spurious illumination of the photo-responsive device by the semiconductor light source.

The efficiency of the preferred embodiment is further improved by supporting semiconductor light source and photo-responsive device 14 at different distances from focusing means 18 as ilustrated in the drawing. Because of the very small size of the opto-electronic elements, they are able to be positioned sufficiently close to one another to use a unitary optical focusing means such as lens 18. However, since they do have finite size, in the range of five to 20 thousandths of an inch, they cannot be precisely in the same place. Accordingly, in one embodiment, it is preferred to place the semiconductor light source 12 at the focal point of lens 18. For all practical purposes, the light-emitting diode behaves as a point source of light located at the focal point of the lens. Photo-responsive device 14 is therefore laterally offset from the focal point of the lens by a small distance and is accordingly, preferably supported by support means 15 at a point between the surface of lens 18 and the focal point of lens 18 to provide for maximum illumination of photo-responsive device 14.

Figure 4:
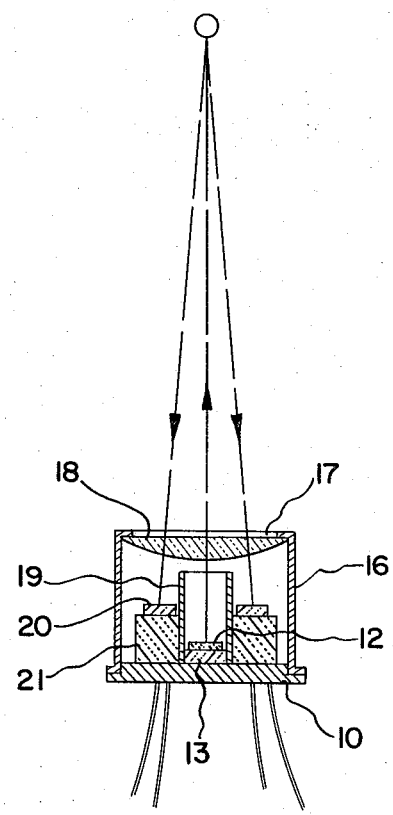
FIG. 4 is a cross-sectional elevation view of a modified embodiment of the active opto-electronic transducer of this invention.

FIG. 4 is a cross-sectional elevation view of an alternative embodiment of this invention. In the FIG. 4 alternative embodiment optical barrier means 11 of FIGS. 1, 2, and 3 is replaced by a cylindrical optical barrier 19 and photo-responsive device 14 and its support means 15 of FIGS. 1, 2, and 3 are replaced by cylindrical support means 21 which support annular photo-responsive device 20. Semiconductor light source 12 and its associated support means 13 are mounted on base member 10 interiorly to cylindrical optical barrier means 19. Cylindrical support means 21 and annular photo-responsive device 20 are mounted on base member 10 exteriorly to cylindrical optical barrier 19. In all other respects, the FIG. 4 embodiment is constructed in the same fashion as the embodiments of FIGS. 1, 2, and 3.

It will be obvious to those skilled in the art that unitary optical focusing means 18 may be any appropriate light-focusing or guiding means as, for example, a lens as shown, or for another example, a fiber optic bundle. This invention is not to be considered to be liimited to any particular form of unitary optical focusing means.

While this invention has been described with reference to particular embodiments and examples, other modifications and variations will appear to those skilled in the art, in view of the above teachings. Accordingly, it should be understood that within the scope of the appended claims, the invention may be practiced otherwise than is specifically described.

The invention claimed is:

1. An active opto-electronic transducer comprising:
 a base member;
 an optical barrier member having first and second sides, said barrier member being disposed on said base member and generally perpendicular thereto;
 a semiconductor light source disposed adjacent said first side of said optical barrier member;
 a photo-responsive device disposed adjacent said second side of said optical barrier member;
 first and second support means for supporting respectively said semiconductor light source and said photo-responsive device in spaced apart relation to said base member, said second support means supporting said photoresponsive device at a greater distance from said base member than the distance from said base member at which said semiconductor light source is supported by said first support means; and
 means for receiving an electrical output from said photo-responsive device, said electrical output being in a first state when said photo-responsive device is illuminated and in a second state when said photo-responsive device is not illuminated.

2. An optical transducer as claimed in claim 1 wherein:
 said optical barrier member is cylindrical in shape;
 said semiconductor light source is disposed interiorly said optical barrier member; and
 said photo-responsive device is annular in shape and is coaxially disposed exteriorly said optical barrier member.

3. An optical transducer claimed in claim 1 wherein said base member and said optical barrier member are formed as a unitary structure.

4. A transducer as claimed in claim 1 wherein said semiconductor light source and said photo-responsive device are so selected that the spectral distribution of energy emitted by said semiconductor light source generally coincides with the spectral response characteristic of said photo-responsive device.

5. The transducer of claim 4 wherein said semiconductor light source is a gallium arsenide light-emitting diode and said photo-responsive device is a silicon phototransistor.

6. An optical transducer as claimed in claim 1 wherein said
 first and second support means comprise electrically insulating thermally conductive material disposed respectively on said base member adjacent said first and second sides of said optical barrier member.

7. The transducer of claim 6 wherein said electrically insulating thermally conductive material is selected from the group consisting of beryllium oxide, boron nitride, and alumina.

8. The transducer of claim 1 further including:
 unitary optical focusing means for directing light from said semiconductor light source toward a location at which an object to be detected is expected and for focusing light reflected from said object onto said photoresponsive device.

9. The transducer of claim 8 further including:
an anti-reflective coating applied to said unitary optical focusing means.

10. The transducer of claim 8 wherein:
said first support means supports said semiconductor light source at a focal point of said unitary optical focusing means; and
said second support means supports said photoresponsive device at a position other than a focal point of said unitary optical focusing means.

11. The transducer of claim 8 wherein said first and second support means comprise electrically insulating thermally conductive material.

* * * * *